(12) United States Patent
 Oowada

(10) Patent No.: US 10,775,538 B2
(45) Date of Patent: Sep. 15, 2020

(54) INORGANIC POLARIZING PLATE AND METHOD OF PRODUCING THE SAME

(71) Applicant: Dexerials Corporation, Shinagawa-ku, Tokyo (JP)

(72) Inventor: Masahiro Oowada, Tome (JP)

(73) Assignee: Dexerials Corporation, Shinagawa-ku, Tokyo (JP)

( * ) Notice: Subject to any disclaimer, the term of this patent is extended or adjusted under 35 U.S.C. 154(b) by 306 days.

(21) Appl. No.: 15/693,918

(22) Filed: Sep. 1, 2017

(65) Prior Publication Data
    US 2018/0067246 A1    Mar. 8, 2018

(30) Foreign Application Priority Data

Sep. 6, 2016 (JP) ................................ 2016-173667

(51) Int. Cl.
    *G02B 5/30* (2006.01)
    *B32B 38/10* (2006.01)
    (Continued)

(52) U.S. Cl.
    CPC .............. *G02B 5/3041* (2013.01); *B32B 3/30* (2013.01); *B32B 15/04* (2013.01); *B32B 38/10* (2013.01); *C03C 15/00* (2013.01); *C03C 17/34* (2013.01); *C03C 17/3607* (2013.01); *C03C 17/3642* (2013.01); *C03C 17/3657* (2013.01);
    (Continued)

(58) Field of Classification Search
    None
    See application file for complete search history.

(56) References Cited

U.S. PATENT DOCUMENTS

2015/0234197 A1* 8/2015 Ushigome ............ G02B 27/283
                                                    353/20
2016/0238748 A1* 8/2016 Lee .................... G02B 5/003

FOREIGN PATENT DOCUMENTS

JP        H1073722 A     3/1998
JP      2012098469 A     5/2012
              (Continued)

OTHER PUBLICATIONS

Jun. 9, 2020, Notification of Reasons for Refusal issued by the Japan Patent Office in the corresponding Japanese Patent Application No. 2016-173667.

*Primary Examiner* — Darryl J Collins
*Assistant Examiner* — Journey F Sumlar
(74) *Attorney, Agent, or Firm* — Kenja IP Law PC

(57) ABSTRACT

Disclosed is an inorganic polarizing plate that exhibits improved heat resistance while suppressing an increase in lead time resulting from addition of process steps and an increase in costs. An inorganic polarizing plate 1 includes: a substrate (11) transparent to light having a wavelength within a used band; a plurality of linear reflective film layers (12) arranged on the substrate (11) at pitches smaller than the wavelength of the light within the used band; a plurality of dielectric film layers (13) arranged on the corresponding reflective film layers (12); and a plurality of absorptive film layers (14) arranged on the corresponding dielectric film layers (13). Each of the absorptive film layers (14) includes: a property-oriented layer (15); and a heat-resistance-oriented layer (16) made of the same material as the property-oriented layer (15) and having an extinction coefficient greater than an extinction coefficient of the property-oriented layer (15).

9 Claims, 7 Drawing Sheets

(51) Int. Cl.

| | | |
|---|---|---|
| *C03C 17/34* | (2006.01) | |
| *B32B 3/30* | (2006.01) | |
| *B32B 15/04* | (2006.01) | |
| *C03C 15/00* | (2006.01) | |
| *C03C 17/36* | (2006.01) | |
| *B32B 37/02* | (2006.01) | |

(52) U.S. Cl.
CPC ............ *G02B 5/3058* (2013.01); *B32B 37/02* (2013.01); *B32B 2307/204* (2013.01); *B32B 2307/42* (2013.01); *C03C 2217/21* (2013.01); *C03C 2217/25* (2013.01); *C03C 2218/154* (2013.01)

(56) References Cited

FOREIGN PATENT DOCUMENTS

| | | |
|---|---|---|
| JP | 2013167823 A | 8/2013 |
| JP | 2014052439 A | 3/2014 |
| JP | 2015062050 A | 4/2015 |
| WO | 2013062104 A1 | 5/2013 |

* cited by examiner

FIG. 3

| Deposition conditions | Discharge power | Flow rate of Ar gas | MV opening degree | Deposition rate |
|---|---|---|---|---|
| Property-oriented condition | 100% | 100% | 75% | 100% |
| Heat-resistance-oriented condition | 115% | 80% | 90% | 108% |

FIG. 5

| Test piece | Deposition conditions | Number of layers | Discharge power | Flow rate of Ar gas | MV opening degree | Deposition rate | Film thickness ratio Heat resistance : Property |
|---|---|---|---|---|---|---|---|
| For comparison (20b) | Property-oriented | 1 | 100% | 100% | 75% | 100% | 0:100% |
| For testing (20a) | Property-oriented/ heat-resistance-oriented | 2 | 100% | 100% | 75% | 100% | 25%:75% |
| | | | 115% | 80% | 90% | 108% | |

The amount of change in reflectance (ΔRn) in heat resistance test at 250°C on absorptive metallic film (λ=430-680nm)

The amount of change in absorption axis reflectance (Rs) in heat resistance test at 250°C The amount of change in absorption axis reflectance (Rs) in heat resistance test at 300°C The amount of change in absorption axis reflectance (Rs) in heat resistance test at 300°C

INORGANIC POLARIZING PLATE AND METHOD OF PRODUCING THE SAME

TECHNICAL FIELD

This disclosure relates to an inorganic polarizing plate and a method of producing the same.

BACKGROUND

Wire-grid inorganic polarizing plates provide polarization splitting performance over a wide wavelength range as compared to polarizing plates using organic substances, and have excellent heat resistance as they are composed of only inorganic materials. Wire-grid inorganic polarizing plates are thus used in liquid crystal display devices requiring high reliability and durability, such as transmissive liquid crystal display projectors. In a liquid crystal display device, the light reflected from a polarizing plate causes deterioration in contrast upon return to the liquid crystal panel. Thus, an absorptive polarizing plate is used to absorb polarization components not transmitted through the polarizing plate.

A known absorptive inorganic polarizing plate has a layered structure that includes: a wire grid composed of a reflective metallic film; a dielectric film and an absorptive metallic film stacked on the wire grid; and a dielectric protection film covering these elements. As increasingly more applications are developed, liquid crystal display devices are demanding higher performance and higher intensity. Accordingly, polarizing plates used in liquid crystal display devices are also required to offer high performance such as high extinction ratio, high transmittance, or the like, and high heat resistance. Inorganic polarizing plates have better heat resistance than polarizing plates composed of organic materials. However, when subjected to high heat load for a long time, a reflective metallic film and a absorptive metallic film in the inorganic polarizing plate may change in optical properties due to thermal oxidation. Therefore, techniques have been proposed to improve the heat resistance of inorganic polarizing plates (see, for example, JP201298469A (PTL 1) and JPH1073722A (PTL 2)).

In PTL 1, for example, a reflective metal layer and a absorptive metallic layer are respectively covered by a dielectric layer as the oxide of the metal constituting the reflective metal layer and a dielectric layer made of the oxide of the material constituting the absorptive metallic layer. In this way, the invention described in PTL 1 makes it difficult for the oxide films on the surfaces of the reflective metal layer and the absorptive metallic layer to grow even if the temperature of the polarizing element rises during use, and optical property fluctuations can be suppressed. In PTL 1, for surface oxidation, an oxide film is formed at low temperature by ultraviolet light irradiation in an oxide-containing atmosphere (ozone gas atmosphere).

In PTL 2, a grid made of metal (Al) is formed on a substrate and subjected to heat treatment at 500° C. in an electric furnace in a dry oxide atmosphere to oxidize the surface, thereby forming a protection film. In this way, the invention described in PTL 2 suppresses the growth of an oxide film in the metal lattice if the temperature of the polarizing element rises during use, thereby suppressing optical property fluctuations.

CITATION LIST

Patent Literature

PTL 1: JP201298469A
PTL 2: JPH1073722A

SUMMARY

However, the conventional techniques involve ultraviolet light irradiation in an ozone gas atmosphere or heat treatment at temperatures of 500° C. or higher to form a surface oxidation layer, and thus have the problem of, for example, increased lead time and cost for additional process steps. In the case of performing heat treatment at high temperature, cracking and deformation may occur in the substrate.

To solve the conventional problems, it could be helpful to provide an inorganic polarizing plate and a method of producing the same.

As a result of my intensive studies, I discovered that it is possible to improve the heat resistance of an inorganic polarizing plate while maintaining the desired properties by forming an absorptive film layer with a first absorptive film layer and a second absorptive film layer having an extinction coefficient greater than that of the first absorptive film layer. The present disclosure was completed based on this discovery.

The present disclosure is based on the above discovery and provides the following:

<1> An inorganic polarizing plate comprising: a substrate transparent to light having a wavelength within a used band; a plurality of linear reflective film layers arranged on the substrate at pitches smaller than the wavelength of the light within the used band; a plurality of first dielectric film layers arranged on the corresponding reflective film layers; and a plurality of absorptive film layers arranged on the corresponding first dielectric film layers, wherein each of the absorptive film layers comprises a first absorptive film layer and a second absorptive film layer made of the same material as the first absorptive film layer and having an extinction coefficient greater than an extinction coefficient of the first absorptive film layer.

In the inorganic polarizing plate of <1>, each of the absorptive film layers comprises a first absorptive film layer and a second absorptive film layer made of the same material as the first absorptive film layer and having an extinction coefficient greater than an extinction coefficient of the first absorptive film layer. This configuration can increase the heat resistance of the inorganic polarizing plate as compared to a configuration in which each absorptive film layer is formed with only a first absorptive film layer.

<2> The inorganic polarizing plate according to <1>, wherein the second absorptive film layer is arranged on the first absorptive film layer.

<3> The inorganic polarizing plate according to <1>, wherein the second absorptive film layer has a refractive index that differs from a refractive index of the first absorptive film layer by 2% or less, and the second absorptive film layer has an extinction coefficient that is greater than an extinction coefficient of the first absorptive film layer by 3% to 7% over the entire visible light range.

<4> The inorganic polarizing plate according to <1>, wherein the inorganic polarizing plate further comprises a second dielectric film layer between the substrate and the reflective film layer.

<5> A method of producing an inorganic polarizing plate, comprising: depositing a reflective film layer on a substrate transparent to light having a wavelength within a used band; depositing a first dielectric film layer on the reflective film layer; depositing an absorptive film layer on the first dielectric film layer; and after the depositing of the absorptive film layer, partially removing the reflective film layer, the first dielectric film layer, and the absorptive film layer to form a grid pattern on the substrate, wherein the depositing of the absorptive film layer is performed by sputtering using the same sputtering target in two steps under a first deposition condition and a second deposition condition different from the first deposition condition.

<6> The method of producing an inorganic polarizing plate according to <5>, wherein the first deposition condition and the second deposition condition are selected such that an absorptive film layer formed under the second deposition condition has an extinction coefficient that is greater than an extinction coefficient of an absorptive film layer formed under the first deposition condition.

<7> The method of producing an inorganic polarizing plate according to <5>, wherein the first deposition condition and the second deposition condition are selected such that an absorptive film layer formed under the second deposition condition has a refractive index that differs from a refractive index of an absorptive film layer formed under the first deposition condition by 2% or less and such that the absorptive film layer formed under the second deposition condition has an extinction coefficient that is greater than an extinction coefficient of the absorptive film layer formed under the first deposition condition by 3% to 7%.

<8> The method of producing an inorganic polarizing plate according to <5>, wherein the first deposition condition and the second deposition condition include discharge power for the sputtering as parameters to be set such that the discharge power of the second deposition condition is greater than the discharge power of the first deposition condition.

<9> The method of producing an inorganic polarizing plate according to <5>, wherein the first deposition condition and the second deposition condition each include a flow rate of inert gas as a parameter to be set such that the flow rate of inert gas of the second deposition condition is lower than the flow rate of inert gas of the first deposition condition.

<10> The method of producing an inorganic polarizing plate according to <5>, wherein the first deposition condition and the second deposition condition include gas pressure for the sputtering as parameters to be set such that the gas pressure of the second deposition condition is lower than the gas pressure of the first deposition condition.

According to the present disclosure, it is possible to provide an inorganic polarizing plate that can address the aforementioned conventional problems and improve heat resistance.

BRIEF DESCRIPTION OF THE DRAWINGS

In the accompanying drawings:

FIG. 3 illustrates exemplary conditions to deposit absorptive film layers;

FIG. 5 illustrates the conditions to deposit absorptive film layers in heat resistance tests;

DETAILED DESCRIPTION

An inorganic polarizing plate according to one of the embodiments disclosed herein, and a method of producing the same will be described with reference to the accompanying drawings. Of course, the present disclosure is not limited to the embodiments disclosed herein and many modifications and variations may be made thereto without departing from the spirit and scope of the disclosure. It should also be noted that the accompanying figures are merely intended to conceptually illustrate the structures and procedures described herein, and elements in the figures are not necessarily drawn to scale.

<1. The Structure of Inorganic Polarizing Plate>

Figure 1:
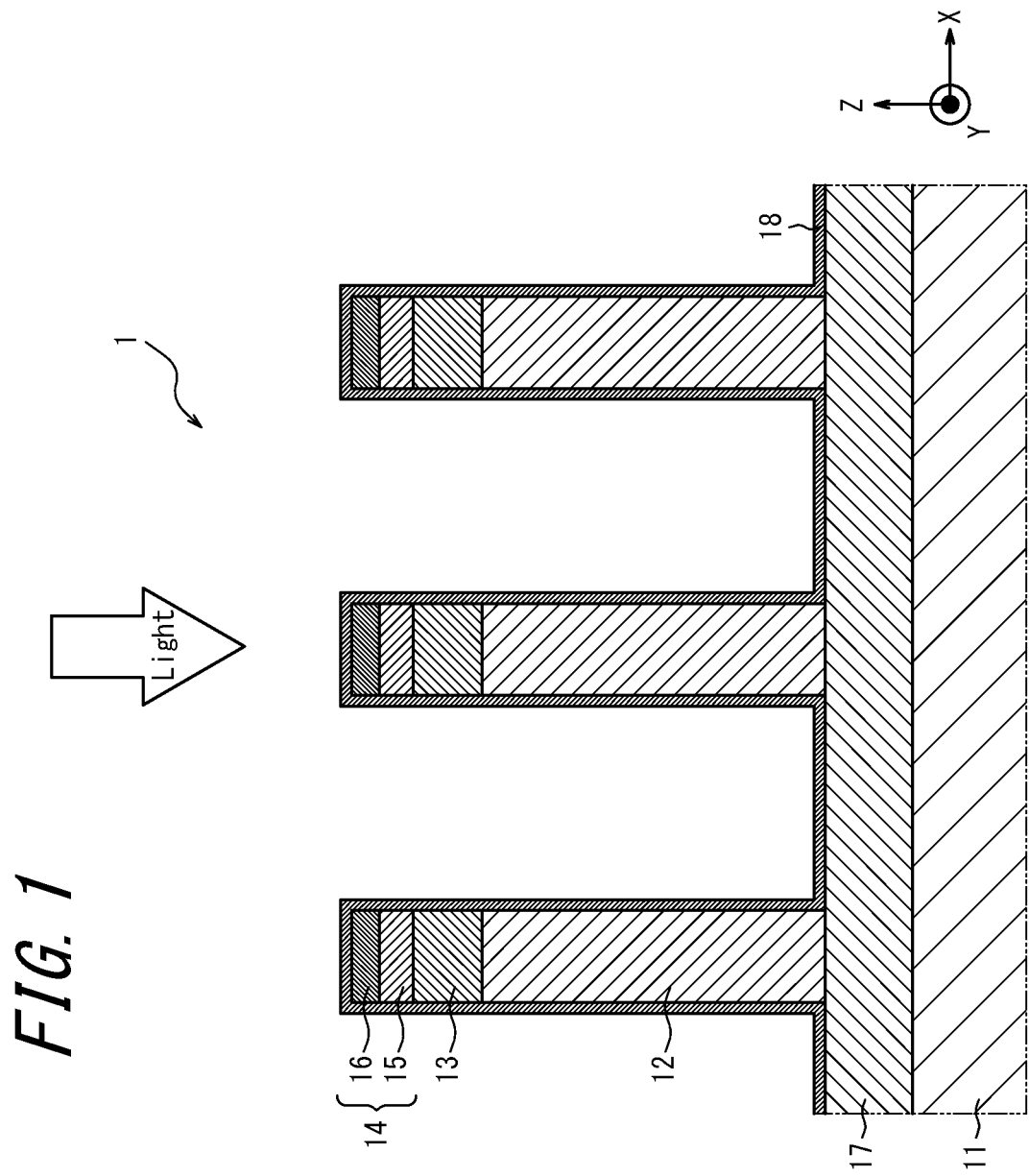
FIG. 1 is a cross-sectional view illustrating an inorganic polarizing plate according to one of the embodiments disclosed herein.

FIG. 1 is a cross-sectional view of an inorganic polarizing plate 1 according to one of the embodiments disclosed herein. In FIG. 1, the X direction is from left to right, the Z direction is bottom to top, and the Y direction is perpendicular to and from back to front of the figure sheet. The inorganic polarizing plate 1 comprises at least: a substrate 11 that is transparent to light within a used band and parallel to the XY plane in FIG. 1; a plurality of linear reflective film layers 12 that are arranged on the substrate 11 at pitches smaller than the wavelength of the light within the used band and extend in the Y direction; a plurality of dielectric film layers 13 that are arranged in a layered manner in the Z direction on the corresponding reflective film layers 12; and a plurality of absorptive film layers 14 that are arranged in a layered manner in the X direction on the corresponding dielectric film layers 13. Each of the absorptive film layers 14 comprises: a property-oriented layer 15 (first absorptive film layer), namely a layer in which greater importance is attached to properties; and a heat-resistance-oriented layer 16 (second absorptive film layer), namely a layer in which greater importance is attached to heat resistance, that is stacked in the Z direction on the property-oriented layer 15, that is made of the same material as the property-oriented layer 15, and that has an extinction coefficient k greater than an extinction coefficient of the property-oriented layer 15. The inorganic polarizing plate 1 may further comprise: a dielectric film layer 17 (second dielectric film layer) deposited between the substrate and the reflective film layers 12; a dielectric protection film layer 18 covering the side of the inorganic polarizing plate 1 from which light is incident; and other optional members. In other words, the polarizing element 1 has a wire grid structure in which at least a reflective film layer 12, a dielectric film layer 13, and an absorptive film layer 14 are laminated together in the stated order from the side of the substrate 11 to form a protrusion extending in the Y direction, and such protrusions are arranged at constant intervals in the X direction on the substrate 11. The wire grid structure takes the form of a one-dimensional grid.

Each absorptive film layer 14 is a substance whose extinction constant of the optical constant is not zero, i.e., that acts to absorb light, such as metals or semiconductors. Optionally, the dielectric protection film 18 may be formed by depositing $SiO_2$ or the like on the top of the polarizing element 1 in order to improve reliability such as moisture resistance, as long as the resulting change in optical properties does not affect the intended applications.

The inorganic polarizing plate 1 utilizes four types of actions, i.e., transmission, reflection, interference, and selective light absorption of polarized light waves by optical anisotropy, to attenuate polarized waves (TE waves (S waves)) having an electric field component parallel to the grid of the reflective film layers 12 and to transmit polarized waves (TM waves (P waves)) having an electric field component perpendicular to the grid.

In FIG. 1, light having a wavelength within the used band is incident from the top downward along the Z direction. An incident TE wave is attenuated by the light-absorbing effect of the absorptive film layers 14. The reflective film layers 12 formed in a grid pattern function as a wire grid to reflect the TE wave transmitted through absorptive film layers 14 and dielectric film layers 13. In addition, the thickness and the refractive index of the dielectric film layers 13 are adjusted as appropriate such that the TE wave reflected from the reflective film layers 12 is partially absorbed in the absorptive film layers 14 when transmitted therethrough, and is partially reflected from the absorptive film layers 14 and returns to the reflective film layers 12. In addition, the light passed through the absorptive film layers 14 is attenuated by interference. Through the selective attenuation of the TE wave, the polarizing element 1 may obtain desired polarization properties.

Each of the absorptive film layers 14 is formed with a property-oriented layer 15 and a heat-resistance-oriented layer 16. The property-oriented layer 15 and the heat-resistance-oriented layer 16 are laminated by sputtering, and are formed with the same metallic material by changing the deposition conditions, using the same sputtering apparatus and the same sputtering target. For the property-oriented layer 15, the deposition conditions are determined based on the specifications required for the inorganic polarizing plate 1. In contrast, the heat-resistance-oriented layers 16 is deposited as an absorptive film that is increased in denseness and heat resistance by changing the deposition conditions to extend the mean free path of sputtered particles. The heat-resistance-oriented layer 16 thus obtained according to this embodiment has an extinction coefficient k greater than that of the property-oriented layer 15 by 3% to 7% over the entire visible light range, while keeping an equivalent optical refractive index n of the material. By covering the surface layer of the property-oriented layer 15 with the heat-resistance-oriented layer 16 having improved heat resistance, it is possible to reduce the influence of thermal oxidation on the absorptive film layer 14 and to increase the heat resistance of the inorganic polarizing plate 1 as a whole.

[Substrate]

The substrate 11 is made of a material that is transparent to light within the used band and that has a refractive index from 1.1 to 2.2, such as, for example, glass, sapphire, or quartz. In this embodiment, a quartz or sapphire substrate with high heat conductivity is preferably used as a constituent material of the substrate 11. As a result, the substrate can be highly light-resistant to intense light and is thus usefully applied to, for example, polarizing plates for optical engines of projectors that generate a large amount of heat.

In the case of the substrate 11 being made of optically active crystals such as quartz, it is possible to yield excellent optical properties by arranging the grid-like protrusions parallel or perpendicular to the optical axis of quartz. As used herein, the optical axis refers to a directional axis in which the difference in refractive index between the ordinary ray and the extraordinary ray of the light traveling along that direction is minimum.

Depending on the use of the inorganic polarizing plate 1, glass, in particular quartz (refractive index: 1.46) or soda-lime glass (refractive index: 1.51) may be used. The chemical composition of the glass material is not particularly limited and may be, for example, an inexpensive glass material such as silicate glass widely used as optical glass to reduce manufacturing costs.

It is also preferable to apply antireflection coating (AR coating), not illustrated, against the light within the used band to the surface on the emergent side (in FIG. 1, in the negative direction along the Z axis) of the substrate 11.

[Dielectric Film Layer]

The dielectric film layer 17, which is formed from $SiO_2$, for example, is formed on the incident side of the substrate 11 (in FIG. 1, in the positive direction along the Z axis) to improve transmittance.

[Reflective Film Layer]

The reflective film layers 12 are formed of thin metal films that are arranged on the dielectric film layer 17 so as to extend in a band-like shape in the Y direction as the absorption axis. Specifically, the reflective film layers 12 function as a wire-grid polarizer to attenuate polarized waves (TE waves (S waves)) having electric field components in the direction parallel to the longitudinal direction of the wire grid (the Y direction) and to transmit polarized waves (TM waves (P waves)) having electric field components in the direction perpendicular to the longitudinal direction of the wire grid (the X direction), among polarized waves of light incident towards the surface of the substrate 11 on which the wire grid is formed.

The reflective film layers 12 may be made of any material as long as it has reflectivity for light within the used band, including, for example, metals such as Al, Ag, Cu, Mo, Cr, Ti, Ni, W, Fe, Si, Ge, or Te, alloys containing these metal elements, and semiconductor materials.

[Dielectric Film Layer]

The dielectric film layers 13 are formed with such a film thickness as to cause the polarized light transmitted through the absorptive film layers 14 and reflected by the reflective film layers 12 to be out of phase by a half wavelength from the polarized light reflected by the absorptive film layers 14. Specific film thickness is set appropriately within the range of 1 nm to 500 nm in which the phase of polarized light can be adjusted and the interference effect can be increased. Since the reflected light is absorbed by the absorptive film layers 14, it is possible to improve contrast without having to optimize the film thickness. Thus, the film thickness may be determined in practice by the balance between the desired polarization properties and the actual production process.

The dielectric film layers 13 may be made of any material including metal oxides such as $SiO_2$, $Al_2O_3$, beryllium oxide, or bismuth oxide, other common materials such as $MgF_2$, cryolite, germanium, titanium dioxide, silicon, magnesium fluoride, boron nitride, boron oxide, tantalum oxide, or carbon, or combinations thereof. Preferably, the dielectric film layers 13 each have a refractive index of greater than 1.0 and not greater than 2.5.

[Absorption Film Layer]

Each of the absorptive film layers 14 comprises: a property-oriented layer 15; and a heat-resistance-oriented layer 16 made of the same material as the property-oriented layer 15. The layered structure of each absorptive film layer 14 can be obtained by changing the deposition conditions while using the same sputtering target. The heat-resistance-oriented layers 16 each exhibit high film denseness and have a large extinction coefficient as compared to the property-oriented layers 15. A larger extinction coefficient k delays deterioration of optical performance caused by heat load.

Materials constituting the absorptive film layers 14 are selected from one or more substances having light-absorbing action, such as metals or semiconductors, according to the wavelength range of light to be applied. The metallic materials include Ta, Al, Ag, Cu, Au, Mo, Cr, Ti, W, Ni, Fe, and Sn, or alloys containing these metal elements. The semiconductor materials include, for example, Si, Ge, Te, ZnO, silicide materials (such as $\beta$-$FeSi_2$, $MgSi_2$, $NiSi_2$, $BaSi_2$, $CrSi_2$, $CoSi_2$, or $TaSi$). With this setup, the polarizing element 1 may have a high extinction ratio for the visible light range to be applied.

When a semiconductor material is used, the band gap energy of the semiconductor material affects the absorption action, and thus the band gap energy should be adjusted to be no greater than the used band. For example, when used in visible light range, it is necessary to use a material that exhibits an absorption feature at a wavelength of 400 nm or more, namely, a material having a band gap of 3.1 eV or less.

[Dielectric Protection Film Layer]

As illustrated in FIG. 1, the polarizing element 1 also comprises a dielectric protection film layer 18 on the grid pattern surface side (light incident side).

The inorganic polarizing plate 1 thus configured may utilize the four types of actions, transmission, reflection, interference, and selective light absorption of polarized waves, to attenuate polarized waves (TE waves (S waves)) having electric field components parallel to the grid of the reflective film layers 12 and to transmit polarized waves (TM waves (P waves)) having electric field components perpendicular to the grid. In other words, TE waves are attenuated by the selective light-absorbing action for polarized waves of the absorptive film layers 14, then transmitted through the absorptive film layers 14 and the dielectric film layers 13, and reflected from the reflective film layers 12 formed in a grid pattern to function as the wire grid. In this respect, by appropriately adjusting the thickness and the refractive index of the dielectric film layers 13, it is possible to cause a TE wave reflected from the reflective film layers 12 to be partially reflected by the absorptive film layers 14 when transmitted therethrough and return to the reflective film layers 12, and to cause the light passed through the absorptive film layers 14 to be attenuated by interference. Through this selective attenuation of TE waves, desired polarization properties can be obtained.

In addition, since the absorptive film layers 14 are formed with the property-oriented layers 15 and the heat-resistance-oriented layers 16, the property-oriented layers 15 are designed to satisfy the property values required for the inorganic polarizing plate 1, such as absorption axis transmittance and absorption axis reflectance, and the surfaces of the property-oriented layers 15 are covered with the heat-resistance-oriented layers 16 having excellent heat resistance. This configuration may provide the absorptive film layers 14 in which optical performance can be guaranteed by the property-oriented layers 15 and property fluctuations due to thermal oxidation can be suppressed by the heat-resistance-oriented layers 16.

<Method of Producing Inorganic Polarizing Plate>

Figure 2:
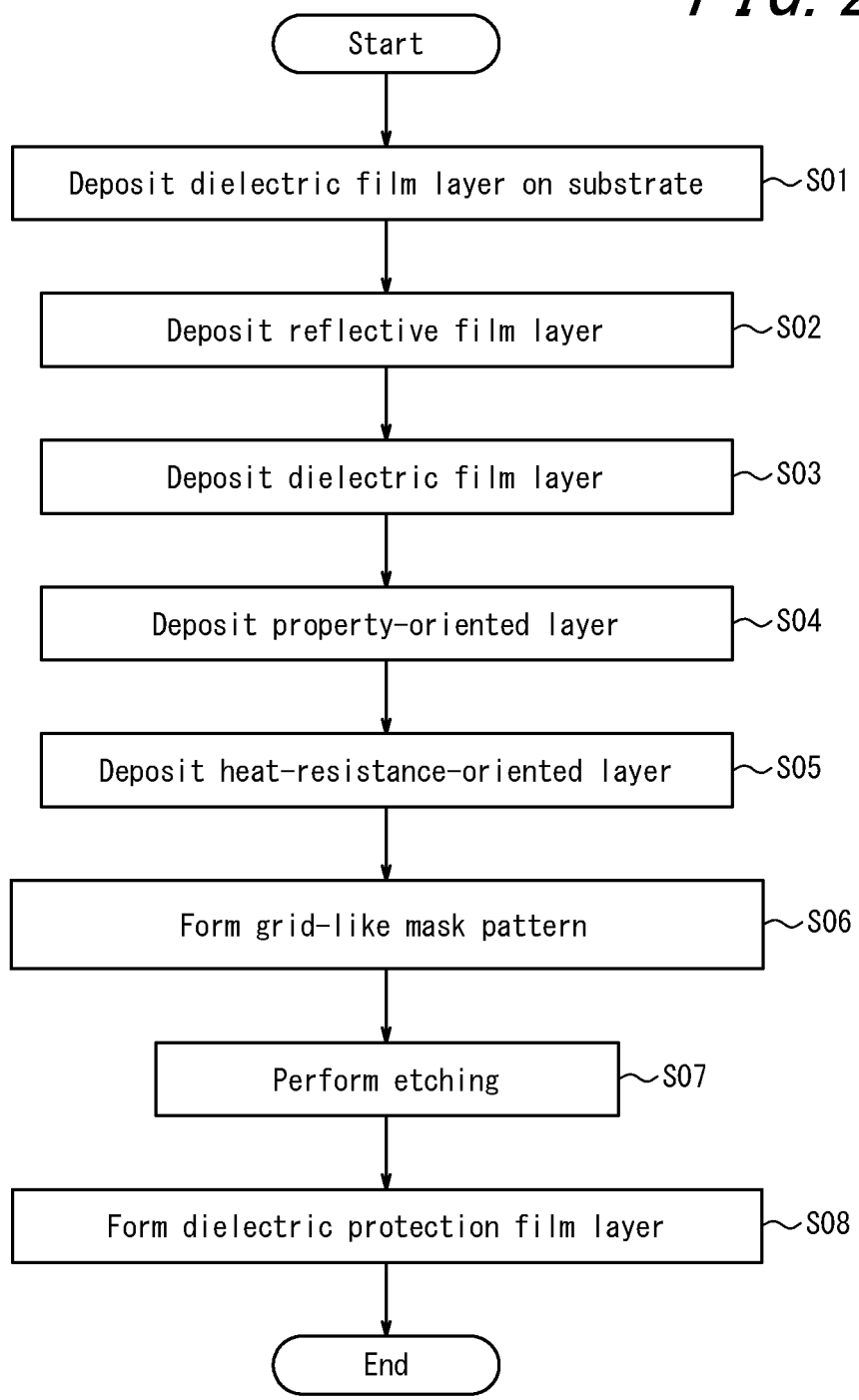
FIG. 2 is a flowchart illustrating a method of producing an inorganic polarizing plate according to one of the embodiments disclosed herein.

Referring now to the flowchart of FIG. 2, a method of producing the inorganic polarizing plate 1 will be described.

First, a dielectric film layer 17 and reflective film layers 12 are laminated on a substrate 1 by sputtering or the like. At this time, the substrate 11 may have predetermined dimensions or the shape of a $\phi$6- or $\phi$8-inch wafer. The method starts with providing a dielectric film layer 17 on the substrate 11 (step S01), and then providing reflective film layers 12 on the dielectric film layer 17 (step S02). The method further provides dielectric film layers 13 on the corresponding reflective film layers 12 (step S03). The method then provides absorptive film layers 14 having optical absorption properties. In depositing the absorptive film layers 14, the method changes the deposition conditions so that property-oriented layers 15 and heat-resistance-oriented layers 16 made of the same metallic material are formed in two stages in order (steps S04 and S05).

In step S04, the property-oriented layers 15 are deposited by sputtering under a property-oriented condition (first deposition condition), which is a deposition condition selected on the basis of the properties required for the inorganic polarizing plate 1. Then, in step S05, the heat-resistance-oriented layers 16 are deposited using the same sputtering target as that used for the property-oriented layers 15 under a heat-resistance-oriented condition (second deposition condition), which is a deposition condition selected such that the mean free path of sputtered particles becomes longer than that under the deposition condition for the property-oriented layers 15. In this way, the extinction coefficient k is improved by 3% to 7% over the entire visible light range, while keeping the optical refractive index n of the material equivalent, specifically, keeping the difference from the refractive index of the property-oriented layers 15 within 2%. In steps S04 and S05, for the property-oriented layers 15 and the heat-resistance-oriented layers 16, the same material may be formed using a dual sputtering apparatus providing different deposition conditions.

FIG. 3 illustrates exemplary deposition conditions. The sputtering apparatus used was BMS-850 manufactured by SHINCRON Co. Ltd. FIG. 3 lists the property-oriented condition and the heat-resistance-oriented condition, with the discharge power of the sputtering apparatus, the flow rate of Ar (argon) gas used as inert gas, the sputtering gas pressure, and the deposition rate under the property-oriented condition being 100%. To lengthen the mean free path, it is preferable that the discharge power under the heat-resistance-oriented condition is adjusted to be larger than the discharge power under the property-oriented condition. Similarly, it is preferable that the flow rate and the gas pressure of Ar gas under the heat-resistance-oriented condition be lower than those under the property-oriented condition.

In the example of FIG. 3, the discharge power of the heat-resistance-oriented layers 16 is set to be 15% larger than that of the property-oriented layers 15, and the flow rate of Ar gas to be 80% of that of the property-oriented layers 15. The gas pressure can be adjusted by adjusting the main valve opening degree (MV opening degree) of the sputtering apparatus. As the main valve opening degree increases, the gas pressure of the Ar gas in the sputtering apparatus drops. In the example of FIG. 3, the main valve opening degree is set to 75% for forming the property-oriented layers 15 and to 90% for forming the heat-resistance-oriented layers 16. With this setup, the deposition rate is improved by 8% compared to that of the property-oriented layers 15.

After step S05, a resist is applied to the substrate 11 on which the dielectric film layer 17, the reflective film layers 12, the dielectric film layers 13, the absorptive film layers 14, and the like have been formed, and then subjected to exposure and development to form a grid-like pattern (step S06). Then, the grid pattern of the resist is transferred to the lower layer by dry etching or wet etching (step S07), and a grid is formed. Finally, a dielectric protection film layer 18 is formed on the grid pattern surface side by CVD deposition or the like (step S08). The dielectric protection film layer 18 may not be provided, and in that case step S08 is omitted.

According to the above-described method of producing an inorganic polarizing plate 1, property-oriented layers 15 and heat resistant emphatic layers 16 can be formed and laminated continuously using the same deposition apparatus without considerable variation in the lead time and before the formation of a grid pattern, and there is no damage to the grid. Accordingly, it is possible to form heat-resistance-oriented layers 16 having excellent heat resistance either in the uppermost layer or the layer directly under the dielectric protection film layer 18 without an increase in the lead time or in costs, which would otherwise be caused by the addition of process steps. In addition, since ultraviolet ray irradiation or heating at 500° C. or higher is not required to form a surface oxidation layer, the substrate 11 will not suffer cracking or deformation and the grid pattern will not be damaged.

EXAMPLES

<Heat Resistance Testing by Simple Test>

Figure 6:
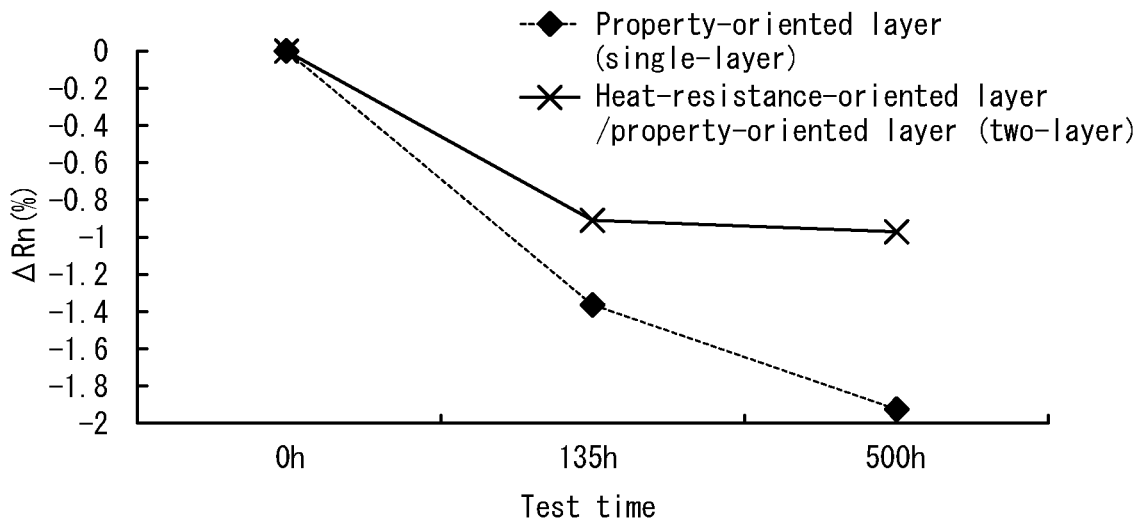
FIG. 6 illustrates the results of heat resistance tests to examine absorptive film layers.

In evaluating the inorganic polarizing plate 1 according to this embodiment, a test piece in which an absorptive film layer was directly formed on a glass substrate was first tested for a change in performance due to heat load. FIG. 4 illustrates the structure of the test piece subjected to the test, and FIG. 5 illustrates the deposition conditions for absorptive film layers in the heat resistance test. FIG. 6 is a graph presenting the results of the heat resistance test. This simple test was conducted to evaluate film quality fluctuations resulting from the thermal oxidation of a single absorptive film layer. Film quality fluctuations are measured as reflectance fluctuations resulting from a decrease in refractive index. If a similar absorptive film layer is applied to a polarizing plate, a refractive index fluctuation due to thermal oxidation cause a phase difference fluctuation and are observed as a reflectance fluctuation.

Figure 4A:
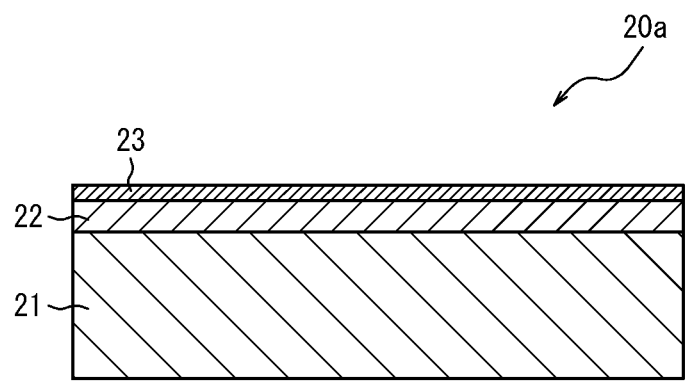
FIGS. 4A and 4B illustrate the structure of test pieces used in heat resistance tests performed to examine absorptive metallic layers.
Figure 4B:
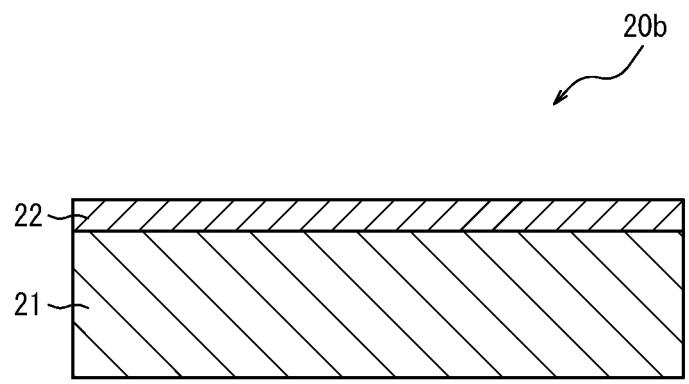

As illustrated in FIG. 4A, a test piece 20a for testing in which a property-oriented layer 22 and a heat-resistance-oriented layer 23 were laminated on a glass (B270) substrate 21, and a comparative test piece 20b in which only a property-oriented layer 22 was formed on the substrate 21 as illustrated in FIG. 4B were prepared and subjected to heat resistance tests.

As illustrated in FIG. 5, when the parameters of the deposition conditions of the property-oriented layer 22 for the test piece 20b for comparison are used as reference points, parameters for the test piece 20a at the time of deposition of the property-oriented layer 22 are set to be equal to the parameters for the test piece 20b. On the other hand, for the test piece 20a, when laminating the heat-resistance-oriented layer 23, the discharge power was set to 115% and the flow rate of Ar gas to 80% as compared to the deposition conditions of the property-oriented layer 22. In addition, the main valve opening degree was set to 75% for the deposition conditions of the property-oriented layer 22 and to 90% for the deposition conditions of the heat-resistance-oriented layer 23. As a result, the deposition rate of the heat-resistance-oriented layer 23 was 108% of that of the property-oriented layer 22. In addition, for the test piece 20a, the film thickness ratio between the heat-resistance-oriented layer 23 and the property-oriented layer 22 was adjusted to be 25%:75%.

After leaving the test pieces 20a and 20b in an oven heated to 250° C. for a predetermined period of time, reflectance fluctuations caused by n-polarized light were examined by spectroscopic measurement. In FIG. 6, the horizontal axis represents heating time and the vertical axis represents n-polarization reflectance. The n-polarization reflectance means the average of the reflectance of p-polarized light and the reflectance of s-polarized light. The reflectance was measured for the light incident on the test pieces 20a, 20b at an incident angle of 5 degrees. From the results after heating for 500 hours, it was revealed that in the test piece 20a provided with the absorptive film layer having the two-layer structure of the property-oriented layer 22 and the heat-resistance-oriented layer 23, reflectance fluctuations resulting from heat load can be reduced by about 50% compared to the case of providing only the property-oriented layer 22. Therefore, the test piece 20a can be assessed such that thermal oxidation was suppressed by the heat-resistance-oriented layer 23 having increased film denseness, and performance deterioration due to thermal oxidation was delayed accordingly.

<Heat Resistance Test on Inorganic Polarizing Plate>

Next, under the same conditions as in the above-described simple test (i.e., those presented in FIG. 5), an inorganic polarizing plate 1 in which two types of absorptive film layers 14 were formed was prepared and subjected to a heat resistance test. To examine property fluctuations, absorption axis reflectance (Rs) was evaluated in visible light wavelength range using a spectrometer.

Figure 7:
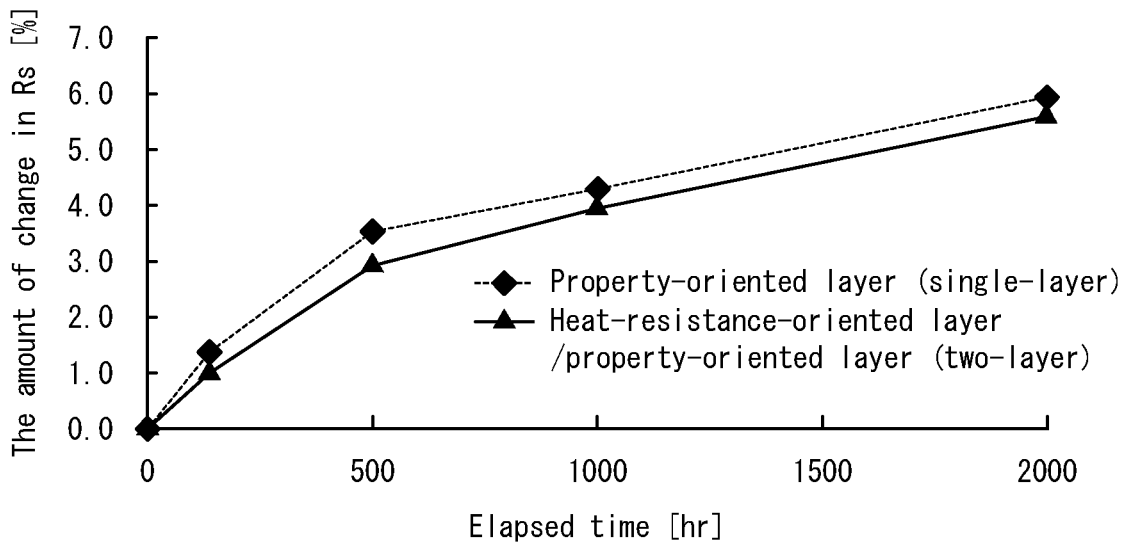
FIG. 7 is a graph illustrating the correlation between the elapsed time and the absorption axis reflectance in heat resistance tests at 250° C. to examine polarizing plates according to examples and comparative examples.
Figure 8:
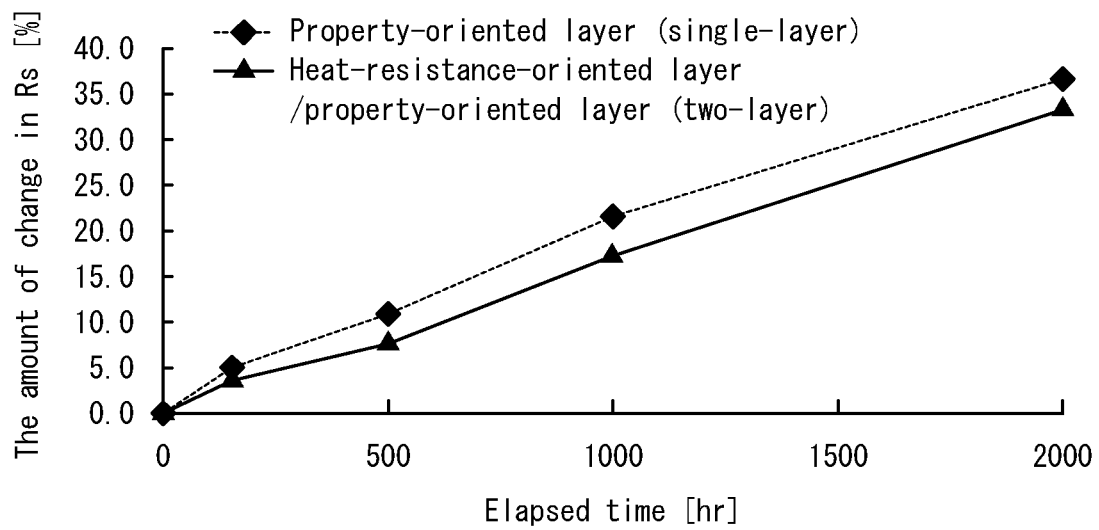
FIG. 8 is a graph illustrating the correlation between the elapsed time and the absorption axis reflectance in heat resistance tests at 300° C. to examine polarizing plates according to examples and comparative examples.

FIG. 7 illustrates the amount of fluctuations in absorption axis reflectance (Rs) when left in an oven heated to 250° C. for up to 2000 hours. FIG. 8 illustrates the amount of fluctuations in absorption axis reflectance (Rs) when left in an oven heated to 300° C. for up to 2000 hours. In FIGS. 7 and 8, the horizontal axis represents the elapsed time (hours) from the start of heating and the vertical axis represents the amount of change (%) in absorption axis reflectance (Rs). The solid line is a graph for an inorganic polarizing plate provided with an absorptive film layer having a two-layer structure of a heat-resistance-oriented layer/a property-oriented layer, and the broken line is a graph for an inorganic polarizing plate provided with an absorptive metallic layer having only a property-oriented layer.

FIGS. 7 and 8 demonstrate that the amount of change in absorption axis reflectance (Rs) is smaller in the inorganic polarizing plate in which the heat-resistance-oriented layer 16 was provided on the property-oriented layer with the ratio between the property-oriented layer 15 and the heat-resistance-oriented layer 16 being set to 25%:75%, than in the inorganic polarizing plate in which the absorptive film layer 14 was formed only by the property-oriented layer 15. In particular, the change in absorption axis reflectance (Rs) was more effectively suppressed in the case of the absorptive film layer 14 being formed of two layers of the property-oriented layer 15 and the heat-resistance-oriented layer 16 up until 500 hours.

Figure 9:
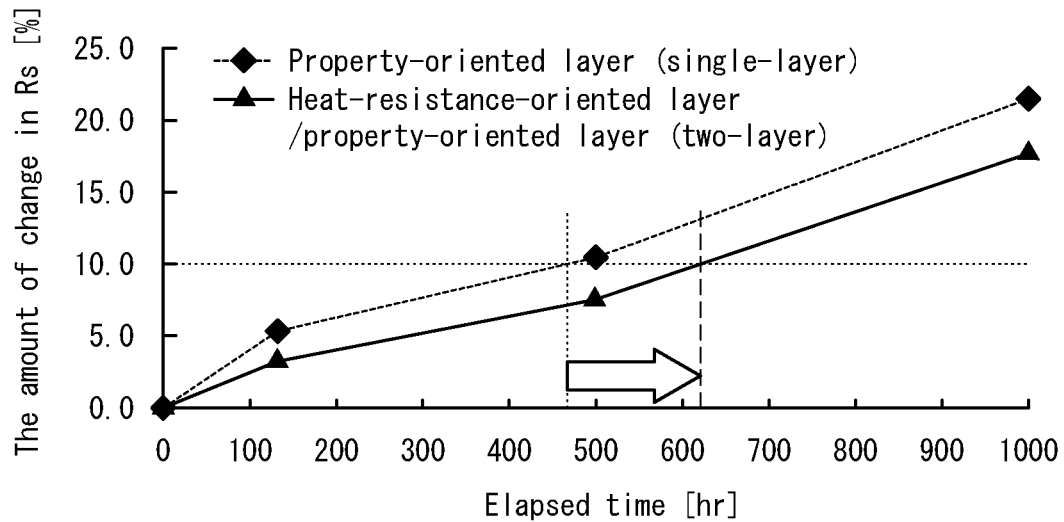
FIG. 9 is a graph illustrating the life-time increasing effect in examples.

FIG. 9 is an enlarged partial view of FIG. 8 for explaining the effect of this embodiment. Assuming an upper limit of 10% for the permissible amount of fluctuations in absorption axis reflectance (Rs), and in the case of the absorptive film layer 14 being formed only of the property-oriented layer 15, the upper limit is reached in an elapsed time of about 460 hours. On the other hand, when the absorptive film layer 14 is formed of two layers of the property-oriented layer 15 and the heat-resistance-oriented layer 16, the upper limit is reached in about 620 hours. Accordingly, the inorganic polarization plate 1 of this embodiment may have the effect of increasing the service life about 1.35 times.

It should be noted that the present disclosure is not limited to the above-described embodiment, and various modifications or changes may be made thereto. For example, in the examples, the discharge power was increased by 15% and the flow rate of inert gas was set to 80% for the deposition conditions of the heat-resistance-oriented layer as compared to the deposition conditions of the property-oriented layer. In addition, the main valve opening degree was set to 70% for the deposition conditions of the property-oriented layer and to 90% for the deposition conditions of the heat-resistance-oriented layer. However, the deposition conditions of the heat-resistance-oriented layer are not so limited. It is expected that a relatively high extinction coefficient k and increased heat resistance can be provided by at least one of: increasing the discharge power, decreasing the flow rate of inert gas, or decreasing the gas pressure, as compared to the deposition conditions of the property-oriented layer. From the results of the examples, it is also expected that a heat-resistance-oriented layer having high heat resistance can be formed by increasing the discharge power by 15% or more and setting the flow rate of inert gas to 80% as compared to those for the deposition conditions of the property-oriented layer, and by setting the main valve opening degree to 90% or more.

REFERENCE SIGNS LIST

1 Inorganic polarizing plate
11 Substrate
12 Reflective film layer
13 Dielectric film layer
14 Absorption film layer
15 Property-oriented layer
16 Heat-resistance-oriented layer
17 Dielectric film layer
18 Dielectric protection layer
21 Substrate
22 Property-oriented layer
23 Heat-resistance-oriented layer

The invention claimed is:

1. An inorganic polarizing plate comprising:
a substrate transparent to light having a wavelength within a used band;
a plurality of linear reflective film layers arranged on the substrate at pitches smaller than the wavelength of the light within the used band;
a plurality of first dielectric film layers arranged on the corresponding reflective film layers; and
a plurality of absorptive film layers arranged on the corresponding first dielectric film layers, wherein
each of the absorptive film layers comprises a first absorptive film layer and a second absorptive film layer made of the same material as the first absorptive film layer and having an extinction coefficient greater than an extinction coefficient of the first absorptive film layer, and
the second absorptive film layer has a refractive index that differs from a refractive index of the first absorptive film layer by 2% or less, and the second absorptive film layer has an extinction coefficient that is greater than an extinction coefficient of the first absorptive film layer by 3% to 7% over the entire visible light range.

2. The inorganic polarizing plate according to claim 1, wherein the second absorptive film layer is arranged on the first absorptive film layer.

3. The inorganic polarizing plate according to claim 1, wherein the inorganic polarizing plate further comprises a second dielectric film layer between the substrate and the reflective film layer.

4. The inorganic polarizing plate according to claim 1, wherein the plurality of absorptive film layers are composed of inorganic materials.

5. A method of producing an inorganic polarizing plate, comprising: depositing a reflective film layer on a substrate transparent to light having a wavelength within a used band;
depositing a first dielectric film layer on the reflective film layer;
depositing an absorptive film layer on the first dielectric film layer; and
after the depositing of the absorptive film layer, partially removing the reflective film layer, the first dielectric film layer, and the absorptive film layer to form a grid pattern on the substrate, wherein
the depositing of the absorptive film layer is performed by sputtering using the same sputtering target in two steps under a first deposition condition and a second deposition condition different from the first deposition condition, and
the first deposition condition and the second deposition condition are selected such that an absorptive film layer formed under the second deposition condition has a refractive index that differs from a refractive index of an absorptive film layer formed under the first deposition condition by 2% or less and such that the absorptive film layer formed under the second deposition condition has an extinction coefficient that is greater than an extinction coefficient of the absorptive film layer formed under the first deposition condition by 3% to 7%.

6. The method of producing an inorganic polarizing plate according to claim 5, wherein the first deposition condition and the second deposition condition are selected such that an absorptive film layer formed under the second deposition condition has an extinction coefficient that is greater than an extinction coefficient of an absorptive film layer formed under the first deposition condition.

7. The method of producing an inorganic polarizing plate according to claim 5, wherein the first deposition condition and the second deposition condition include discharge power for the sputtering as parameters to be set such that the discharge power of the second deposition condition is greater than the discharge power of the first deposition condition.

8. The method of producing an inorganic polarizing plate according to claim 5, wherein the first deposition condition and the second deposition condition each include a flow rate of inert gas as a parameter to be set such that the flow rate of inert gas of the second deposition condition is lower than the flow rate of inert gas of the first deposition condition.

9. The method of producing an inorganic polarizing plate according to claim 5, wherein the first deposition condition and the second deposition condition include gas pressure for the sputtering as parameters to be set such that the gas pressure of the second deposition condition is lower than the gas pressure of the first deposition condition.

* * * * *